United States Patent
Stephkov et al.

(10) Patent No.: US 10,749,929 B2
(45) Date of Patent: Aug. 18, 2020

(54) PROVIDING EYEWEAR EQUIPMENT USING A SAME IDENTIFIER AMONG DESIGNER, MANUFACTURER, AND PURCHASER

(71) Applicant: Essilor International, Charenton-le-Pont (FR)

(72) Inventors: Natacha Stephkov, Charenton-le-Pont (FR); Frederic Arrouy, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 731 days.

(21) Appl. No.: 14/436,879

(22) PCT Filed: May 2, 2013

(86) PCT No.: PCT/EP2013/059196
§ 371 (c)(1),
(2) Date: Apr. 18, 2015

(87) PCT Pub. No.: WO2014/060120
PCT Pub. Date: Apr. 24, 2014

(65) Prior Publication Data
US 2015/0288741 A1    Oct. 8, 2015

(30) Foreign Application Priority Data
Oct. 18, 2012  (EP) .................................... 12306288

(51) Int. Cl.
*H04L 29/08* (2006.01)
*G06Q 30/06* (2012.01)
*H04L 29/06* (2006.01)

(52) U.S. Cl.
CPC ......... *H04L 67/06* (2013.01); *G06Q 30/0621* (2013.01); *H04L 67/42* (2013.01)

(58) Field of Classification Search
CPC .. G06F 19/00; G06Q 30/0603; G06Q 10/087; G06Q 20/12; G06Q 30/0601; G02C 13/005; G02C 13/003
(Continued)

(56) References Cited

U.S. PATENT DOCUMENTS 6,142,628 A * 11/2000 Saigo ................... G02C 13/003
                                                      351/204
6,533,418 B1 * 3/2003 Izumitani ............. G02C 13/003
                                                      351/204
(Continued)

FOREIGN PATENT DOCUMENTS

EP          1154302 A1    11/2001

OTHER PUBLICATIONS

Extended European Search Report for EP Application No. 17179712.9; dated Sep. 11, 2017.
(Continued)

*Primary Examiner* — David P Zarka
(74) *Attorney, Agent, or Firm* — Oblon, McClelland, Maier & Neustadt, L.L.P.

(57) ABSTRACT

A method implemented by computer means for providing at least part of eyewear equipment adapted to a wearer is described. The method comprises a wearer data receiving step (S1). The method comprises a wearer data storing step (S2). The method comprises an identifier sending step (S3). The method comprises an eyewear equipment design sending step (S4). The method comprises an eyewear equipment data receiving step (S5). The method comprises an eyewear equipment data storing step (S6). The method comprises an eyewear equipment data sending step (S7).

19 Claims, 3 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 6,535,223 | B1* | 3/2003 | Foley | A61B 3/111 |
| | | | | 345/629 |
| 6,944,327 | B1* | 9/2005 | Soatto | G02C 13/003 |
| | | | | 351/159.75 |
| 2002/0159025 | A1* | 10/2002 | Legerton | G02C 7/047 |
| | | | | 351/159.1 |
| 2003/0007123 | A1* | 1/2003 | Broderick | G02C 7/046 |
| | | | | 351/159.74 |
| 2003/0063105 | A1* | 4/2003 | Agnew | G06T 11/60 |
| | | | | 345/660 |
| 2004/0004633 | A1* | 1/2004 | Perry | G06Q 30/0603 |
| | | | | 715/728 |
| 2004/0030617 | A1* | 2/2004 | Shinbo | G06Q 10/087 |
| | | | | 705/28 |
| 2005/0278229 | A1* | 12/2005 | Igo | G06F 19/3456 |
| | | | | 705/26.1 |
| 2008/0151184 | A1* | 6/2008 | Spivey | G02C 7/02 |
| | | | | 351/178 |
| 2012/0022985 | A1* | 1/2012 | Yoshida | B24B 9/148 |
| | | | | 705/34 |
| 2012/0226722 | A1* | 9/2012 | Van Buskirk, II | |
| | | | | G06F 21/6218 |
| | | | | 707/827 |
| 2014/0257839 | A1* | 9/2014 | Suter | G06Q 30/0633 |
| | | | | 705/2 |
| 2015/0049304 | A1* | 2/2015 | Cussac | G02C 7/028 |
| | | | | 351/159.75 |

OTHER PUBLICATIONS

International Preliminary Report on Patentability and Written Opinion of the International Searching Authority for International Application No. PCT/EP2013/059196, dated Apr. 21, 2015, (8 pages).

* cited by examiner

PROVIDING EYEWEAR EQUIPMENT USING A SAME IDENTIFIER AMONG DESIGNER, MANUFACTURER, AND PURCHASER

CROSS REFERENCE TO RELATED APPLICATIONS

This application is a U.S. national stage application of International Application No. PCT/EP2013/059196 filed May 2, 2013, which claims the benefit of priority to EP Application No. 12306288.7 filed Oct. 18, 2012; the entirety of each of said applications is incorporated herein by reference.

FIELD OF THE INVENTION

The invention relates to a method implemented by computer means, for providing at least part of an eyewear equipment adapted to a wearer and a network data-processing device comprising means arranged for implementing the method.

BACKGROUND

The discussion of the background of the invention herein is included to explain the context of the invention. This is not to be taken as an admission that any of the material referred to was published, known or part of the common general knowledge at the priority date of any of the claims.

Usually, an eyewear equipment wearer wishing to have an eyewear equipment goes to see an eye care practitioner.

The eye care practitioner orders the eyewear equipment at an optical lab by sending an order request to the optical lab. The order request comprises wearer data, for example the wearer's prescription, spectacle frame data, for example the type of spectacle frame the wearer has selected, and lens data, for example the type of optical lens the wearer has selected.

The optical lab receives the order request and sends it to an optical lens designer. The lens designer uses some of the data comprised in the order request to calculate the design of the optical lenses to be provided to the wearer. The optical design determined by the lens designer is sent to the optical lab and the optical lenses are manufactured based on the calculated design.

The manufactured optical lenses can be processed to add the optical treatments according to the order request.

The optical lenses are then sent to the eye care practitioner. The optical lenses may be edged to fit the spectacle frame prior to being sent to the eye care practitioner and mounted on the spectacle frame.

The current optical lens delivering process presents some drawbacks.

In recent years, new optical designs have been invented. These new optical designs are more and more personalized according to the wearer. To calculate such optical designs the lens designer needs more and more wearer parameters, therefore the data transmitted between the different actors of the lens delivering process comprises more and more parameters. In the actual delivering process all the wearer parameters are transmitted to all the actors of the processing device making the data exchange more and more complex.

Furthermore, when a lens designer creates a new design allowing or taking into consideration a new wearer parameter, the current lens delivering process requires that all the actors involved in the delivering process update their interfaces so as to be able to receive and send such new parameters. Even though, some of the actors of the delivering process may have no interest in this new parameter. In other words, when a lens designer wishes to propose a new optical design that considers a new wearer parameter, all of the actors of the optical lens delivering process need to update their interfaces, making the proposition of a new optical design complex, time consuming and costly.

Therefore, the current delivering process is not well adapted to the most recent optical designs and to the proposition of new optical designs.

SUMMARY

An aim described herein is to propose a method for providing at least part of an eyewear equipment adapted to a wearer that does not present the above mentioned drawbacks.

To this end, what is described herein relates to a method implemented by computer means, for providing at least part of an eyewear equipment adapted to a wearer, the method comprising:

a wearer data receiving step during which a first set of data comprising at least wearer data is receiving from an ordering side, a wearer data storing step during which the first set of data is stored and associated with an eyewear equipment identifier ID identifying said part of an eyewear equipment, an identifier sending step during which the eyewear equipment identifier ID is sent to the ordering side, an eyewear equipment design sending step during which a second set of data comprising at least part of the stored first set of data is sent to an eyewear equipment designer side, upon reception of an eyewear equipment design request comprising at least the eyewear equipment identifier ID, an eyewear equipment data receiving step during which a third set of data comprising at least eyewear equipment data calculated using the second set of data is receiving from the eyewear equipment designer side, an eyewear equipment data storing step during which the third set of data is stored and associated with the eyewear equipment identifier ID, an eyewear equipment data sending step during which a fourth set of data comprising at least the eyewear equipment data comprised in the stored third set of data associated with the eyewear equipment identifier ID is sent to an eyewear equipment manufacturer side, upon reception of an eyewear equipment data request comprising at least the eyewear equipment identifier ID, the fourth set of data being used to manufacture said at least part of the eyewear equipment.

What is described herein also relates to a method implemented by computer means, for providing at least a part of an eyewear equipment adapted to a wearer, the method comprising the steps of:

receiving from an ordering side, an eyewear equipment order comprising at least an eyewear equipment identifier ID associated with a first set of stored data stored on a distant computer system, the first set of stored data comprising at least wearer data and eyewear equipment data, sending a request to the distant computer system for at least the eyewear equipment data part of the stored data associated with the eyewear equipment identifier ID, receiving from the distant computer system a second set of data comprising at least the eyewear equipment data associated with the eyewear equipment identifier ID, manufacturing at least a part of the eyewear equipment using the eyewear equipment data comprised in the second set of data, sending the manufactured part of the eyewear equipment to the ordering side.

What is described herein further relates to a method implemented by computer means, for determining eyewear equipment data corresponding to at least part of an eyewear equipment adapted to a wearer, the method comprising the steps of:

receiving from an ordering side, an eyewear equipment data order comprising at least an eyewear equipment identifier ID associated with a first set of stored data stored on a distant computer system, the first set of stored data comprising at least wearer data, sending a request to the distant computer system for at least part of the first set of stored data associated with the eyewear equipment identifier ID, receiving from the distant computer system a second set of data comprising at least part of the wearer data associated with the eyewear equipment identifier ID, determining eyewear equipment data of at least a part of the eyewear equipment using the wearer data comprised in the second set of data, storing the eyewear equipment data associated with the eyewear equipment identifier ID on the distant computer system.

According to further embodiments, which can be considered alone or in combination:

the method further comprises prior to the second sending step:

an eyewear equipment design receiving step during which a fifth set of data comprising at least eyewear equipment design data is received from an eyewear equipment manufacturer side, an eyewear equipment design storing step during which the fifth set of data is stored and associated with the stored first set of data and the eyewear equipment identifier; and/or the eyewear equipment is at least an optical lens and/or a spectacle frame and/or an active eyewear equipment; and/or the eyewear equipment data comprises process manufacturing data adapted to the manufacturing device used by the eyewear equipment manufacturer for manufacturing said part of the eyewear equipment; and/or the method further comprises after the identifier sending step:

an eyewear equipment personalization sending step during which a sixth set of data comprising at least part of the stored data is sent to an eyewear equipment personalization side, upon reception of an eyewear equipment personalization request comprising at least the eyewear equipment identifier, an eyewear equipment personalization data receiving step during which a seventh set of data comprising at least eyewear equipment personalization data obtained using the sixth set of data is receiving from the eyewear equipment personalization side, an eyewear equipment personalization data storing step during which the seventh set of data is stored and associated with the eyewear equipment identifier ID; and/or the eyewear equipment personalization data relate to another part of the eyewear equipment than the one manufactured by the eyewear equipment manufacturer; and/or the eyewear equipment is a pair of spectacle lenses, the eyewear equipment data relate to the optical lenses and the eyewear equipment personalization data relate to the spectacle frame; and/or the steps are performed by a networked data-processing device comprising at least a server and a storage unit, the networked data processing device being connected to the ordering side, the eyewear equipment designer side and the eyewear equipment manufacturer and wherein at least one of the ordering, the eyewear equipment designer side and the eyewear equipment manufacturer is connected to the network data processing device over the internet.

The invention also relates to a network data-processing device comprising means for:

receiving from an ordering side, a first set of data comprising at least wearer data, storing the first set of data and associating the stored first set of data with an eyewear equipment identifier identifying said part of an eyewear equipment adapted to the wearer, sending to the ordering side the eyewear equipment identifier, receiving an eyewear equipment design request comprising at least the eyewear equipment identifier, sending to an eyewear equipment designer side a second set of data comprising at least part of the stored first set of data, upon reception of the eyewear equipment design request, receiving from the eyewear equipment designer side, a third set of data comprising at least eyewear equipment data calculated using the second set of data, storing the third set of data and associating the stored third set of data with the eyewear equipment identifier, receiving an eyewear equipment data request comprising at least the eyewear equipment identifier, sending to an eyewear equipment manufacturer side a fourth set of data comprising at least the eyewear equipment data comprised in the stored third set of data associated with the eyewear equipment identifier, upon reception of the eyewear equipment data request, the fourth set of data being used to manufacture said at least part of the eyewear equipment.

According to further embodiments, which can be considered alone or in combination:

the network data-processing further comprises means for:

receiving from an eyewear equipment manufacturer side, a fifth set of data comprising at least eyewear equipment design data, storing the fifth set of data and associating the stored fifth set of data with the stored first set of data and the eyewear equipment identifier; and/or the network data-processing further comprises means for:

receiving an eyewear equipment personalization request comprising at least the eyewear equipment identifier, sending to an eyewear equipment personalization side a sixth set of data comprising at least part of the stored data, upon reception of the eyewear equipment personalization request, receiving from the eyewear equipment personalization side a seventh set of data comprising at least eyewear equipment personalization data obtained using the sixth set of data, storing the seventh set of data and associating the stored seventh set of data with the eyewear equipment identifier.

According to a further aspect, what is described herein relates to a computer program product comprising one or more stored sequences of instructions that are accessible to a processor and which, when executed by the processor, causes the processor to carry out the steps of the method according to the invention.

What is described herein further relates to a computer readable medium carrying one or more sequences of instructions of the computer program product according to the invention.

Furthermore, what is described herein relates to a program which makes a computer execute the method of the invention.

What is described herein also relates to a computer-readable storage medium having a program recorded thereon, where the program makes the computer execute the method of the invention.

What is described herein further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments presented herein may include apparatuses for performing the operations herein. This apparatus may be specially constructed for the desired purposes, or it may comprise a general purpose computer or a Field Programmable Gate Array ("FPGA") or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments presented herein are not described with reference to any particular programming language. It will be appreciated that a variety of programming languages may be used to implement the teachings of the embodiments as described herein.

BRIEF DESCRIPTION OF THE DRAWINGS

Other features and advantages presented herein will become apparent from the following description of non-limitative embodiments, with reference to the attached drawings in which.

DESCRIPTION

What is described herein relates to a method implemented by computer means, for providing at least part of an eyewear equipment adapted to a wearer.

The eyewear equipment may be an optical lens and/or a spectacle frame and/or an active eyewear equipment. By "optical lens" what is meant is any optical lens comprising without limitation spectacle lens, contact lens, an intraocular lens and the like. By "optical lens adapted to a wearer" what is meant is that the optical lens meets at least the requirements of an ophthalmic prescription of the wearer.

Figure 1:
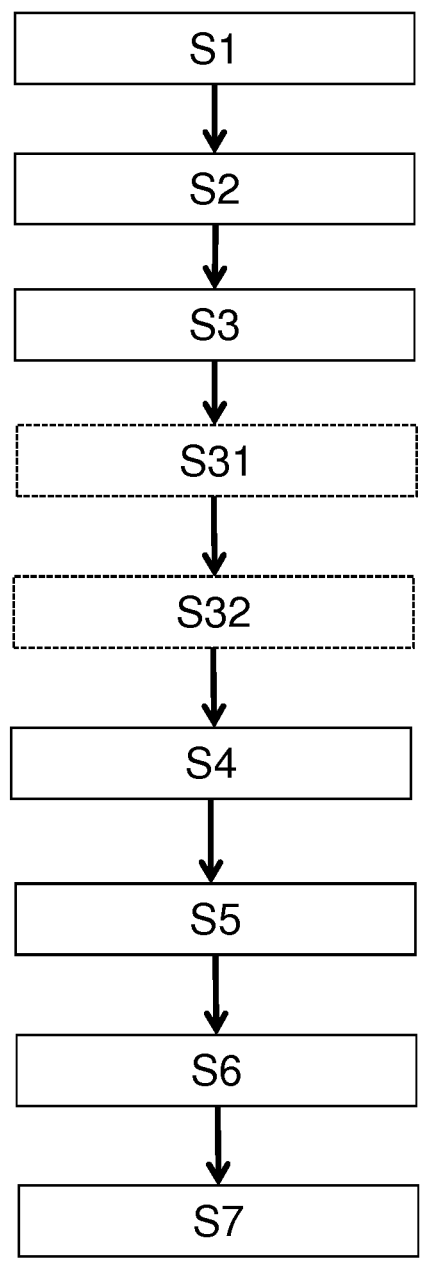
FIG. 1 is a flowchart of the different steps of a method according to the invention.

According to an embodiment illustrated on FIG. 1, the method comprises:
  a wearer data receiving step S1,
  a wearer data storing step S2,
  an identifier sending step S3,
  an eyewear equipment design sending step S4,
  an eyewear equipment data receiving step S5,
  an eyewear equipment data storing step S6, and
  an eyewear equipment data sending step S7.

Figure 2:
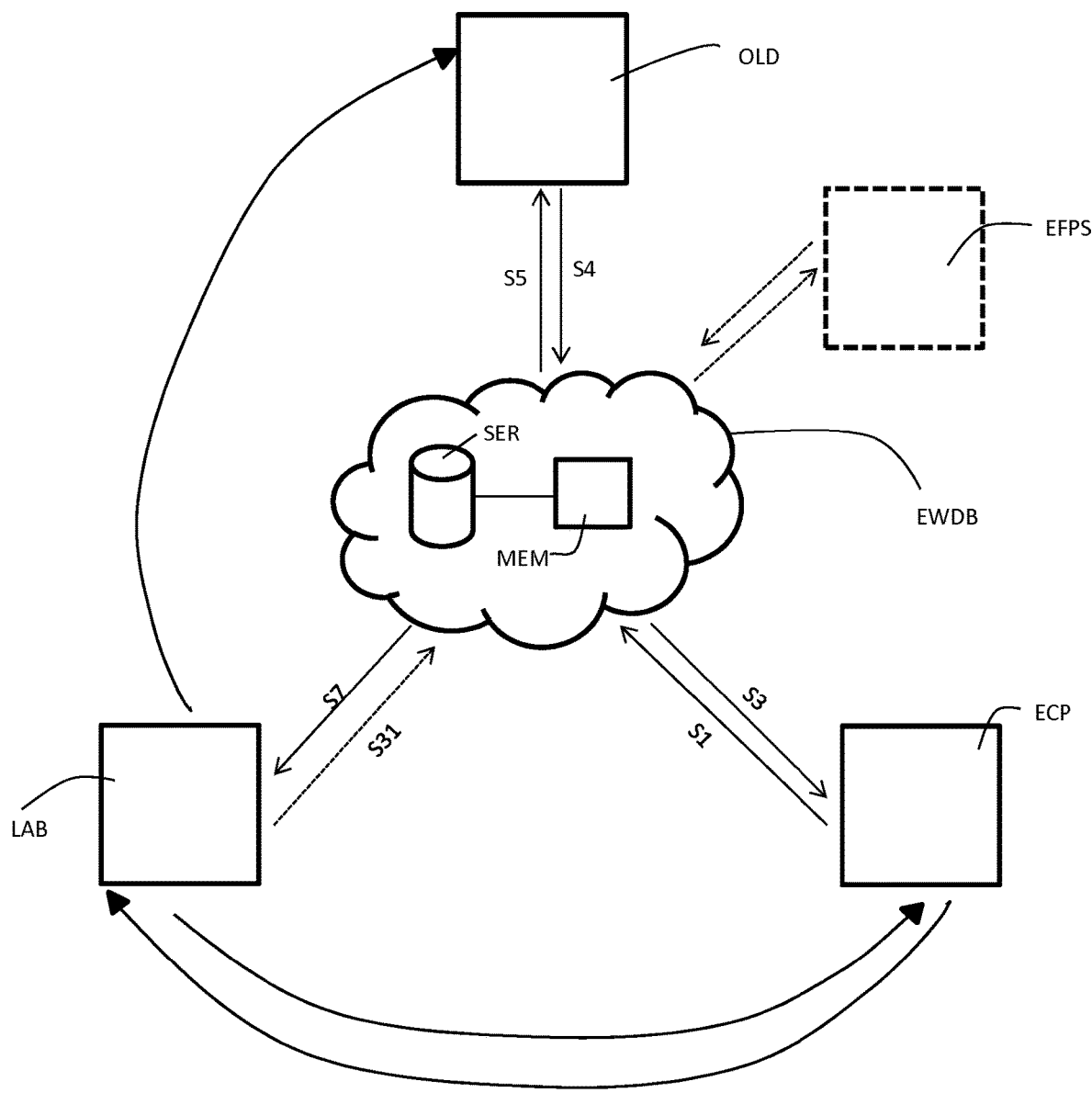
FIG. 2 diagrammatically represents an example of optical lens supply system implementing the method according to the invention.

As illustrated on FIG. 2, the method described herein may be performed by a networked data processing device EWDB comprising a server SER and a storage unit MEM. The networked data processing device being connected at least to an ordering side ECP, for example an eye care practitioner, an eyewear manufacturer LAB, for example an optical lens manufacturer and an eyewear equipment designer OLD, for example an optical lens designer.

The networked data processing device EWDB is connected to at least one, for example, all, of the ordering side ECP, eyewear manufacturer LAB, and eyewear equipment designer OLD, over the internet.

During the wearer data receiving step S1, a first set of data D1 is received by the networked data processing device EWDB from the ordering side ECP. The first set of data D1 comprises at least wearer data. The wearer data may comprise the wearer's prescription data, including, for example, the spherical power, astigmatism, cylinder axis of the astigmatism, power addition or other wearer data. The wearer data may comprise further individual data, such as, for example, interpupillary distance, vertex distance, pantoscopic angle, the wearer's proportion to move his head or eyes to follow a peripheral target, or any other data related to the wearer.

The first set of data D1 may further comprise data relative to a spectacle frame intended to carry the lens. Such data may comprise spectacle frame information including, for example, information related to the inner rim shape of the spectacle frame intended to carry the optical lens, measurements of the rim dimensions, a tilt angle of such rims, or other spectacle frame information.

According to an embodiment presented herein, the first set of data may comprise a simple reference to a type of spectacle frame selected by the wearer, for example, a frame model reference.

Additionally, the first set of data may comprise data related to a choice of a type of optical lens, for example, the lens optical design, the lens material, its coating, or other choice data.

During the wearer data storing step S2, the first set of data D1 is stored by the networked data processing device EWDB, for example in the storing unit MEM. When stored the first set of data D1 is associated with an eyewear equipment identifier ID identifying the part of an eyewear equipment to be provided.

The eyewear equipment identifier ID is sent to the ordering side ECP during the identifier sending step S3.

After having received the eyewear equipment identifier ID, the ordering side ECP may contact an eyewear equipment manufacturer so as to have at least part of the eyewear equipment provided.

Advantageously, when contacting the eyewear equipment manufacturer LAB, the ordering side ECP may provide very little information, for example, an indication that at least part of an eyewear equipment is requested and the eyewear equipment identifier ID received during the eyewear equipment identifier step S3.

During the eyewear equipment design sending step S4, a second set of data D2 comprising at least part of the stored first set of data D1 is sent to an eyewear equipment designer side LDS, for example, an ophthalmic lens designer side. The second set of data D2 is sent Set to the eyewear equipment designer side LDS upon reception of an eyewear equipment design request comprising at least the eyewear equipment identifier ID.

The eyewear equipment design corresponds to the parameters which define the shape of the eyewear equipment.

In the case of an ophthalmic lens the design may be the changes in sphere and cylinder on the surfaces of the lens and in the case of a frame its shape.

In the case of an ophthalmic lens the "Design" is a widely used wording known from the man skilled in the art to designate the set of parameters allowed to define an optical function of a generic optical system; each ophthalmic lens manufacturer has its own designs, particularly for aspherical lens and for progressive lens. As for an example, a progressive lens "design" results from an optimization of the progressive surface so as to restore a presbyope's ability to see clearly at all distances but also to optimally respect all physiological visual functions, such as, foveal vision, extra-foveal vision, binocular vision and to minimize unwanted astigmatisms. Progressive lens "designs" are tested through rigorous clinical trials before being commercialized.

According to an embodiment presented herein, the eyewear equipment manufacturer LAB contacted by the ordering side ECP has to contact an eyewear equipment designer so as to have the design of at least part of the eyewear equipment determined. For example, the eyewear equipment designer may determine the optical design of the ophthalmic lens to be provided.

Advantageously, when contacting the eyewear equipment designer LDS, the eyewear equipment manufacturer LAB may provide very little information, for example, an indication that design information for at least part of an eyewear equipment is requested and the eyewear equipment identifier ID received during the eyewear equipment identifier step S3.

Once the eyewear equipment designer wishes to obtain the information he may need data concerning the eyewear equipment, he sends an eyewear equipment design request comprising at least the eyewear equipment identifier ID and receives in return the second set of data D2.

During the eyewear equipment data receiving step S5 a third set of data D3 comprising at least eyewear equipment data OLD calculated using the second set of data D2 is received from the eyewear equipment designer side LDS. The eyewear equipment data OLD may comprise data defining geometrical and optical characteristics of the optical lens to be provided.

According to an embodiment presented herein, the eyewear equipment data OLD may comprise process manufacturing data adapted to the manufacturing devices used by the eyewear equipment manufacturer for manufacturing at least part of the eyewear equipment.

The third set of data D3 is stored and associated with the eyewear equipment identifier ID during the eyewear equipment data storing step S6.

During the eyewear equipment data sending step S7 a fourth set of data D4 is sent to an eyewear equipment manufacturer side upon reception of an eyewear equipment data request comprising at least the eyewear equipment identifier ID.

The fourth set of data D4 comprises at least the eyewear equipment data OLD comprised in the stored third set of data associated with the eyewear equipment identifier ID.

The eyewear equipment manufacturer uses the fourth set of data D4 to manufacture at least part of the eyewear equipment.

Once at least part of the eyewear equipment is manufactured said part of the eyewear equipment may be sent to the ordering side.

Advantageously, the method described herein allows reduction of the information exchanged between the different actors of the eyewear delivering process. In particular, each actor, for example, the manufacturer and/or the designer, may have access to the wearer and equipment information using the eyewear equipment identifier ID.

According to an embodiment illustrated on FIG. 1, the method may further comprise prior to the eyewear equipment design sending step S4:

an eyewear equipment design receiving step S31, and
an eyewear equipment design storing step S32.

During the eyewear equipment design receiving step S31 a fifth set of data D5 comprising at least eyewear equipment design data is received from an eyewear equipment manufacturer side LAB. The fifth set of data D5 is stored and associated with the stored first set D1 of data and the eyewear equipment identifier ID.

Advantageously, the embodiment allows the eyewear manufactured to specify specific design data. For example, the eyewear manufacturer may specify the type of optical design he is equipped to manufacture and/or the type of equipment he uses or any other information that may be useful for the eyewear equipment designer.

As illustrated on FIG. 2, further actors may receive and add information to the networked data-processing device.

According to an embodiment presented herein, an eyewear equipment personalization actor EEPS may receive and add information to the networked data-processing device EWDB. The eyewear equipment personalization actor may be a spectacle lens provider, optical treatments provider or any other eye wearer equipment personalization actor.

For example, the first set of data D1 may comprise a simple reference to a type of spectacle frame but no spectacle frame measurements. The eyewear equipment personalization actor may be a spectacle frame provider that, based on the type of spectacle frame selected by the wearer, provides a spectacle frame to the eyewear ordering side. Measurements of the provided spectacle frame may be of use for the eyewear equipment manufacturer and/or designer.

According to an embodiment presented herein, the method according to the invention may further comprise after the identifier sending step S3:

an eyewear equipment personalization sending step SP1,
an eyewear equipment personalization data receiving step SP2, and
an eyewear equipment personalization data storing step SP3.

During the eyewear equipment personalization sending step SP1 a sixth set of data D6 comprising at least part of the stored data is sent to an eyewear equipment personalization side EEPS, upon reception of an eyewear equipment personalization request comprising at least the eyewear equipment identifier ID. For example, the sixth set of data D6 may comprise a spectacle frame reference.

During the eyewear equipment personalization data receiving step SP2 a seventh set of data D7 comprising at least eyewear equipment personalization data EEPD obtained using the sixth set of data D6 is received from the eyewear equipment personalization side. For example, a spectacle frame corresponding to the spectacle frame reference comprised in the sixth set of data is measured and the measurements of said spectacle frame are received during the eyewear equipment personalization data receiving step SP2.

The seventh set of data D7 is stored and associated with the eyewear equipment identifier ID during the eyewear equipment personalization data storing step SP3.

Advantageously, other actors, such as the manufacturer and/or the designer may access to the data comprised in the seventh set of data D7 without having to be in direct contact with the eyewear equipment personalization actor.

Therefore, new personalization actors may enhance the stored data and any other actors may access the new personalization data without having to put in place a specific link with the other new personalization actors.

Figure 3:
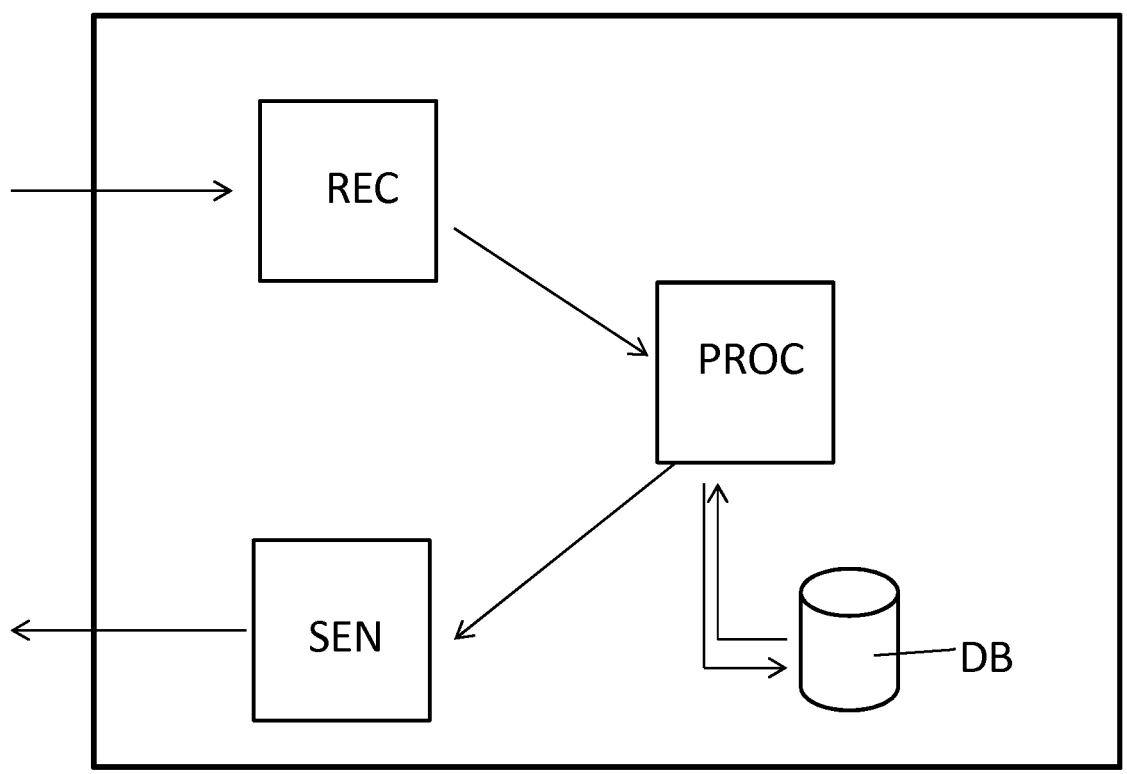
FIG. 3 represents a networked data-processing device according to the invention.

As illustrated on FIG. 3, the invention also relates to a network data-processing device configured to implement the method described herein. The network data-processing device comprises at least a receiving module REC, a processing module PROC, a storing module DB, for example, a data-base type, and a sending module SEN.

The receiving module is configured so as to receive at least requests and data from distant entities.

The processing module is configured so as to process the requests and data received by the receiving module.

The sending module is configured so as to send data to distant entities.

First, the receiving module REC receives a first set of data D1 comprising at least wearer data. The first set of data may be sent by an ordering side.

The first set of data received by the receiving module REC is transferred to the processing module PROC. The processing module associates the first set of data D1 with an eyewear equipment identifier ID identifying at least a part of an eyewear equipment to be provided to a wearer. The first set of data and the eyewear equipment identifier ID are stored in the storing module DB.

The processing module PROC has the sending module SEN send the eyewear equipment identifier ID to the ordering side.

The receiving module is arranged to receive an eyewear equipment design request, for example, from an eyewear equipment designer side, and to transfer such request to the processing module. The processing module is configured so as to, upon reception of the eyewear equipment design request, extract and have the sending module send a second set of data D2, for example, to the eyewear equipment designer side. The second set of data comprises at least part of the stored set of data.

The receiving module is arranged to receive a third set of data D3, for example, from the eyewear equipment designer side, and to transfer the third set of data D3 to the processing module. The third set of data comprising at least eyewear equipment data.

The processing module associates the third set of data D3 with the eyewear equipment identifier ID identifying and storing the third set of data D3 in the storing module DB.

The receiving module is arranged to receive an eyewear equipment data request, for example, from an eyewear equipment manufacturer side, and to transfer such request to the processing module. The processing module is configured so as to, upon reception of the eyewear equipment data request, extract and have the sending module send a fourth set of data D4, for example, to the eyewear equipment manufacturer side. The fourth set of data comprises at least part of the eyewear equipment data OLD.

According to an embodiment presented herein, the receiving module is configured to receive, for example, from an eyewear equipment manufacturer side LAB, a fifth set of data comprising at least eyewear equipment design data and to transfer the fifth set of data to the processing module PROC. The processing module PROC is arranged to associate the fifth set of data to the eyewear equipment identifier ID and to associate the fifth set of data to the eyewear equipment data.

According to an embodiment presented herein, the receiving module is arranged to receive an eyewear equipment personalization request, for example, from an eyewear equipment personalization side, and to transfer such request to the processing module. The processing module is configured so as to, upon reception of the eyewear equipment personalization request, extract and have the sending module send a sixth set of data D6, for example, to the eyewear equipment personalization side. The sixth set of data D6 comprises at least part of the stored set of data.

The receiving module REC is further arranged to receive a seventh set of data D7 comprising at least eyewear equipment personalization data. The seventh set of data D7 may be sent by the eyewear equipment personalization side.

The seventh set of data D7 received by the receiving module REC is transferred to the processing module PROC. The processing module associates the seventh set of data D7 with the eyewear equipment identifier ID. The seventh set of data D7 and the eyewear equipment identifier ID are stored in the storing module DB.

The invention has been described above with the aid of embodiments without limitation of the general inventive concept as defined in the claims.

The invention claimed is:

1. A method implemented by computer means, for providing at least part of an eyewear equipment adapted to a wearer, the method comprising:
obtaining a networked data-processing device;
a wearer data receiving step during which a first set of data comprising at least wearer individual data and data related to a choice of a type of optical lens is received at the networked data-processing device from a remote location, the wearer individual data defining wearer prescription data and the data related to the choice of the type of optical lens relating to at least one of an optical lens design, a lens material, and a coating of the lens;

a wearer individual data storing step during which the first set of data is stored as a stored first set of data and associated with an eyewear equipment identifier ID identifying said at least part of an eyewear equipment;

an identifier sending step during which the eyewear equipment identifier ID is sent to the remote location from the networked data-processing device;

an eyewear equipment design sending step during which a second set of data comprising at least part of the stored first set of data as well as at least a parameter defining a shape of the at least part of an eyewear equipment is sent to an eyewear equipment designer from the networked data-processing device upon receipt of an eyewear equipment design request comprising at least the eyewear equipment identifier ID;

an eyewear equipment data receiving step during which a third set of data comprising, at least eyewear equipment data calculated using the second set of data, said eyewear equipment data comprising process manufacturing data adapted to manufacturing devices used by an eyewear equipment manufacturer for manufacturing said at least part of said eyewear equipment is received from the eyewear equipment designer at the networked data-processing device;

an eyewear equipment data storing step during which the third set of data is stored as a stored third t of data and associated with the eyewear equipment identifier ID; and an eyewear equipment data sending step during which a fourth set of data comprising at least the process manufacturing data comprised in the stored third set of data associated with the eyewear equipment identifier ID is then sent to the eyewear equipment manufacturer from the networked data-processing device, upon receipt of an eyewear equiptment data request comprising at least the eyewear equipment identifier ID, the fourth set of data being used to manufacture said at least part of the eyewear equipment.

2. The method according to claim 1, further comprising prior to the eyewear equipment design sending step an eyewear equipment design receiving step during which a fifth set of data comprising at least eyewear equipment design data is received from the eyewear equipment manufacturer and an eyewear equipment design storing step during which the fifth set of data is stored an associated with the stored first set of data and the eyewear equipment identifier ID.

3. The method according to claim 1, wherein the eyewear equipment is selected from at least one of an optical lens, a spectacle frame, and an active eyewear equipment.

4. The method according to claim 1, wherein the eyewear equipment data comprises process manufacturing data adapted to a manufacturing device used by the eyewear equipment manufacturer for manufacturing said at least part of the eyewear equipment.

5. The method according to claim 1, further comprising after the identifier sending step at least one of:

an eyewear equipment personalization sending step during which a sixth set of data comprising at least part of the stored first set of data is sent to an eyewear equipment personalization unit upon receipt of an eyewear equipment personalization request comprising at least the eyewear equipment identifier ID, an eyewear equipment personalization data receiving step during which a seventh set of data comprising at least eyewear equipment personalization data obtained using the sixth set of data is received from the eyewear equipment personalization unit, and an eyewear equipment personalization data storing step during which the seventh set of data is stored and associated with the eyewear equipment identifier ID.

6. The method accord ng to claim 5, wherein the eyewear equipment personalization data includes data related to a separate part of the eyewear equipment that is not eyewear equipment manufactured by the eyewear equipment manufacturer.

7. The method according to claim 5, wherein the eyewear equipment is a pair of spectacle lenses, the eyewear equipment data related to an optical lens, and the eyewear equipment personalization data includes data related to a spectacle frame.

8. The method according to claim 1, wherein the steps are performed by the networked data-processing device comprising at least a server and a storage unit, the networked data processing device being connected to one or more locations selected from the remote location, the eyewear equipment designer and the eyewear equipment manufacturer, and wherein connection with the network data processing device is over the internet.

9. The method of claim 1, wherein the eyewear equipment manufacturer may access the wearer individual data by the eyewear equipment identifier ID.

10. The method of claim 1, wherein the eyewear equipment designer may access the wearer individual data by the eyewear equipment identifier ID.

11. The method of claim 1, wherein the eyewear equipment manufacturer may access the eyewear equipment design data by the eyewear equipment identifier ID.

12. The method of claim 1, wherein the eyewear equipment designer may access eyewear equipment manufacturer data by the eyewear equipment identifier ID.

13. The method of claim 1, wherein the remote location is an eye care practitioner.

14. A network data-processing device comprising:

a non-transitory computer readable medium; and program instructions stored on the non-transitory computer readable-medium and executable by at least one processor to:

receive from a remote location, a first set of data comprising at least wearer individual data defining wearer prescription data about a wearer and at least data related to a choice of a type of optical lens, the data related to the choice of the type of optical lens relating to at least one of an optical lens design, a lens material, and a coating of the lens;

store the first set of data as a stored first set of data and associate the stored first set of data with an eyewear equipment identifier ID identifying part of an eyewear equipment adapted to the wearer;

send to the remote location the eyewear equipment identifier ID;

receive an eyewear equipment design request comprising at least the eyewear equipment identifier ID;

send to an eyewear equipment designer a second set of data comprising at least part of the stored first set of data as well as at least a parameter defining a shape of the at least part of an eyewear equipment upon receipt of the eyewear equipment design request;

receive from the eyewear equipment designer a third set of data comprising at least eyewear equipment data calculated using the second set of data, said eyewear equipment data comprising process manufacturing data adapted to manufacturing devices used by an eyewear equipment manufacturer for manufacturing said at least part of an eyewear equipment;

store the third set of data as a stored third set of data and associate the stored third set of data with the eyewear equipment identifier ID;

receive an eyewear equipment data request comprising at least the eyewear equipment identifier ID; and send to the eyewear equipment manufacturer a fourth set of data comprising at least the process manufacturing data comprised in the stored third set of data associated with the eyewear equipment identifier ID upon receipt of the eyewear equipment data request, the fourth set of data being used to manufacture said part of the eyewear equipment.

15. The network data-processing device according to claim 14, further comprising program instructions to:

receive from an eyewear equipment manufacturer a fifth set of data comprising at least eyewear equipment design data; and store the fifth set of data as a stored set of data and associate the stored fifth set of data with the stored first set of data and the eyewear equipment identifier ID.

16. The network data-processing device according to claim 14, further comprising program instructions to:

receive an eyewear equipment personalization request comprising at least the eyewear equipment identifier ID, send to an eyewear equipment personalization unit a sixth set of data comprising at least part stored data upon receipt of the eyewear equipment personalization request;

receive from the eyewear equipment personalization unit a seventh set of data comprising at least eyewear equipment personalization data obtained using the sixth set of data; and store the seventh set of data as stored seventh set of data and associate the stored seventh set of data with the eyewear equipment identifier ID.

17. The network data-processing device according to claim 14, wherein the network data-processing device comprises in for processing data, storing data, sending data and receiving data.

18. A computer program product stored on computer memory and executed on a processor that when used on computer apparatus causes the processor to process at least one of the following steps:

a wearer data receiving step during which a first set of data comprising at least wearer individual data and data related to a choice of a type of optical lens is received at a networked data-processing device from a remote location, the wearer individual data defining wearer prescription data and the data related to the choice of the type of optical lens relating to at least one of an optical lens design, a lens, and a coating of the lens;

a wearer individual data storing step daring which the first set of data is stored as a stored first set of data and associated with an eyewear equipment identifier ID identifying at least part of an eyewear equipment;

an identifier sending step during which the eyewear equipment identifier ID is sent to the remote location from the networked data-processing device;

an eyewear equipment design sending step during which a second set of data comprising at least part of the stored first set of data as well as at least a parameter defining a shape of the at least part of an eyewear equipment are sent to an eyewear equipment designer from the networked data-processing device upon receipt of an eyewear equipment design request comprising at least the eyewear equipment identifier ID;

an eyewear equipment data receiving step during which a third set of data comprising at least eyewear equipment data calculated using the second set of data, said eyewear equipment data comprising process manufacturing data adapted to manufacturing devices used by an eyewear equipment manufacturer for manufacturing said at least part of an eyewear equipment is received from the eyewear equipment designer at the networked data-processing device;

an eyewear equipment data storing step during which the third set of data is stored as a stored third set of data and associated with the eyewear equipment identifier ID; and an eyewear equipment data sending step during which a fourth set of data comprising at least the process manufacturing data comprised in the stored third set of data associated with the eyewear equipment identifier ID is then sent to an eyewear equipment manufacturer from the networked data-processing device, upon receipt of an eyewear equipment data request comprising at least the eyewear equipment identifier ID, the fourth set of data being used to manufacture said at least part of the eyewear equipment.

19. A non-transitory computer readable medium storing a computer program that when executed by a processor on a computer apparatus causes the processor to carry out one or more of the following steps:

a wearer data receiving step during which a first set of data comprising at least wearer individual data and data related to a choice of a type of optical lens is received at a networked data-processing device from a remote location, the wearer individual data defining wearer prescription data and the data related to the choice of the type of optical lens relating to at least one of an optical lens design, a lens material, and a coating of the lens;

a wearer individual data storing step during which the first set of data is stored as a stored first set of data and associated with an eyewear equipment identifier ID identifying at least part of an eyewear equipment;

an identifier sending step during which the eyewear equipment identifier ID is sent to the remote location from the networked data-processing device;

an eyewear equipment design sending step during which a second set of data comprising at least part of the stored first set of data as well as at least a parameter defining a shape of the at least part of an eyewear equipment are sent to an eyewear equipment designer from the networked data-processing device upon receipt of an eyewear equipment design request comprising at least the eyewear equipment identifier ID;

an eyewear equipment data receiving step during which a third set of data comprising at least eyewear equipment data calculated using the second set of data, said eyewear equipment data comprising process manufacturing data adapted to manufacturing devices used by an eyewear equipment manufacturer for manufacturing said at least part of an eyewear equipment is received from the eyewear equipment designer at the networked data-processing device;

an eyewear equipment data storing step during which the third set of data is stored as a stored third set of data and associated with the eyewear equipment identifier ID; and an eyewear equipment data sending step during which a fourth set of data comprising at least the process manufacturing data comprised in the stored third set of data associated with the eyewear equipment identifier ID is then sent to an eyewear equipment manufacturer from the networked data-processing device, upon receipt of an equipment data request comprising at least the eyewear equipment identifier ID, the fourth set of data being used to manufacture said at least part of the equipment.

* * * * *